United States Patent
Arnold et al.

(10) Patent No.: US 6,965,918 B1
(45) Date of Patent: Nov. 15, 2005

(54) SYSTEM AND METHOD FOR INTEGRATED MANAGEMENT OF ELECTRONIC MESSAGES

(75) Inventors: Gordon Arnold, Cary, NC (US); Robert Schreiber, Elkton, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,331

(22) Filed: Jan. 4, 2000

Related U.S. Application Data

(60) Provisional application No. 60/132,098, filed on Apr. 30, 1999.

(51) Int. Cl.[7] ............................................. G06F 15/16
(52) U.S. Cl. ........................ 709/206; 709/218; 709/224
(58) Field of Search ............................... 709/206, 207, 709/224, 218; 379/93.15, 93.24, 88.12

(56) References Cited

U.S. PATENT DOCUMENTS

| | | | |
|---|---|---|---|
| 5,333,266 A | 7/1994 | Boaz et al. | 395/200 |
| 5,513,126 A | 4/1996 | Harkins et al. | 364/514 |
| 5,530,739 A | 6/1996 | Okada et al. | 379/89 |
| 5,530,740 A | 6/1996 | Irribarren et al. | 379/89 |
| 5,647,002 A | 7/1997 | Brunson | 380/49 |
| 5,822,526 A | 10/1998 | Waskiewicz | 395/200.36 |
| 5,826,023 A | 10/1998 | Hall et al. | 395/200.36 |
| 5,826,025 A * | 10/1998 | Gramlich | 709/217 |
| 5,838,923 A | 11/1998 | Lee et al. | 395/200.66 |
| 5,872,926 A | 2/1999 | Levac et al. | 395/200.36 |
| 6,088,796 A * | 7/2000 | Cianfrocca et al. | 713/152 |
| 6,092,101 A * | 7/2000 | Birrell et al. | 709/206 |
| 6,125,388 A * | 9/2000 | Reisman | 709/218 |
| 6,128,624 A * | 10/2000 | Papierniak et al. | 707/104.1 |
| 6,175,858 B1 * | 1/2001 | Bulfer et al. | 709/206 |
| 6,233,318 B1 * | 5/2001 | Picard et al. | 379/88.17 |
| 6,363,414 B1 * | 3/2002 | Nicholls et al. | 709/206 |
| 6,442,250 B1 * | 8/2002 | Troen-Krasnow et al. | 379/93.15 |
| 6,487,584 B1 * | 11/2002 | Bunney | 709/206 |
| 6,633,910 B1 * | 10/2003 | Rajan et al. | 709/224 |

* cited by examiner

*Primary Examiner*—John Follansbee
*Assistant Examiner*—Jinsong Hu
(74) *Attorney, Agent, or Firm*—Pillsbury Winthrop Shaw Pittman LLP

(57) ABSTRACT

An email proxy server system gives the user access to all of their email accounts through a unified port. The proxy server maintains a mail registration database associating the user's ID with multiple email accounts, which may be hosted on different Internet providers and otherwise. The email messages stored on the email hosts may be in POP3 format, which configuration the proxy server imitates to give the user an impression of transparent access to all of their email accounts. Because the ability to access individual mail boxes is unbound from particular internet addresses, one user may maintain any number of email mail boxes at different hosting servers, and change those addresses, without having to reprogram client, server, and other software. Moreover, the presentation of the integrated interface of the invention permits system administrators to attach service modules, such as billing and other packages directly to the proxy server to serve each of the different email accounts, without having to tailor those individual services to individual hosts hardware.

51 Claims, 7 Drawing Sheets

SYSTEM AND METHOD FOR INTEGRATED MANAGEMENT OF ELECTRONIC MESSAGES

This application claims priority from U.S. Provisional Patent Application Ser. No. 60/132,098, filed Apr. 30, 1999.

FIELD OF THE INVENTION

The invention relates to the field of communications, and more particularly the integrated management of multiple email accounts.

BACKGROUND OF THE INVENTION

The advent of the Internet has increased the demand for email and other electronic messaging services. Most Internet service providers (ISPs) offer email accounts automatically when a new user is registered. In terms of Internet email transport, the overall client/server protocol employed for transmitting email messages is the Simple Mail Transfer Protocol (SMTP). The host mail server run by the typical ISP includes an SMTP server, which handles email by managing queues and reconciling addresses. Most ISPs offer consumer Internet accounts based on dial-up (PPP) protocols. Under this protocol the consumer client, operating a personal computer or other device, uploads mail to the host email server using SMTP and downloads mail using the Post Office Protocol, presently version 3 (POP3). The typical architecture is illustrated in FIG. 1. POP3 is a low-overhead protocol for general download service, offering the ability to perform basic operations such as listing and deleting email messages.

However, deploying POP3 for email access entails disadvantages. One is that the client's personal computer must be programmed to know the precise address of the root email mailbox, by identifying the IP address of the host mail server. If the account holder's mailbox is moved to a different host mail server at a different IP address, the software on the client's personal computer must be reprogrammed to reflect the new destination. As a result, ISPs are reluctant to move account holder mailboxes, and can only do so with great attention. This limits the flexibility of ISPs in deploying new mail hosting technologies, including to change or upgrade mail servers.

Another disadvantage of the POP3 architecture is that if an account holder chooses to change ISPs entirely, there is in general no mechanism to transfer the account holder's email mailbox to the new service provider, intact. There is, moreover, no provision for the coexistence of two mailboxes with the same account name but different mail server hosts. Thus, a consumer who has changed ISPs must periodically check both the old email mailbox and the new mailbox until the transition is complete. Similarly, when an account holder maintains both a business email address and a personal email address, they must access each of those mailboxes separately.

Moreover, on the server side, ISPs need to maintain their host mail servers with modules to register and process billing information, account statistics and other value-added services. There are no industry standards for those mail server services, and they vary from one ISP to the next. Consequently, individual ISPs are effectively locked into a single vendor's package to maintain attendant services at the level of the mail server, or be forced to write conversion software when a new service package is introduced, so as not to disrupt the addressing scheme for their customers. Other problems exist.

SUMMARY OF THE INVENTION

The invention overcoming these and other problems in the art relates to an integrated message management system and method, including a proxy server, which mediates the delivery of messages between a client workstation and multiple POP3 email servers. The proxy server communicates with the client workstation using the POP3 protocol, and maintains an associated mail registration database. The mail registration database contains entries for all of the user's email accounts, their IP addresses and associated ISP entities.

When the user wants to access their mail, the proxy server distributes mail update requests to one or more of the POP servers belonging to the user. Localizing and integrating all of the user's account addressing and other information within the dedicated proxy server relieves the user and the network service provider from needing to reprogram clients and servers every time a new email account is shifted, added or deleted. Among other advantages, this permits relatively painless and transparent migration and the coexistence of multiple mailboxes. The invention affords greater latitude in the movement of an email mailbox amongst mailbox servers of different types, as well.

From the server point of view, the invention also allows the ISP to both deploy a common interface to the client workstation as a front-end manager, as well as permit a unified interface for server-side administrative packages.

BRIEF DESCRIPTION OF THE DRAWINGS

The invention will be described with respect to the accompanying drawings, in which like elements are indicated by like numbers.

DETAILED DESCRIPTION OF THE PREFERRED EMBODIMENTS

Figure 1:
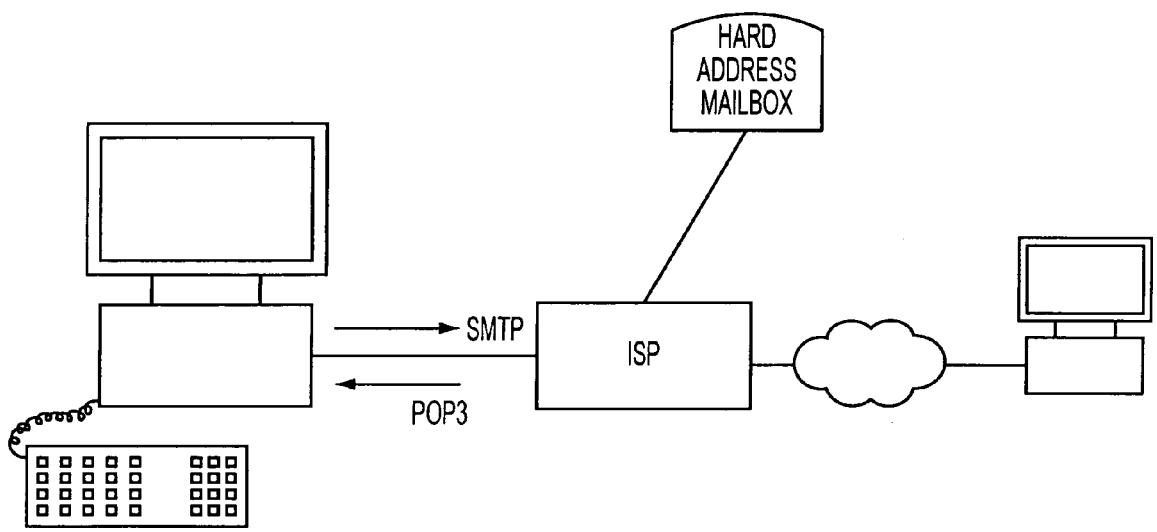
FIG. 1 illustrates an email architecture according to conventional delivery protocols.
Figure 2:
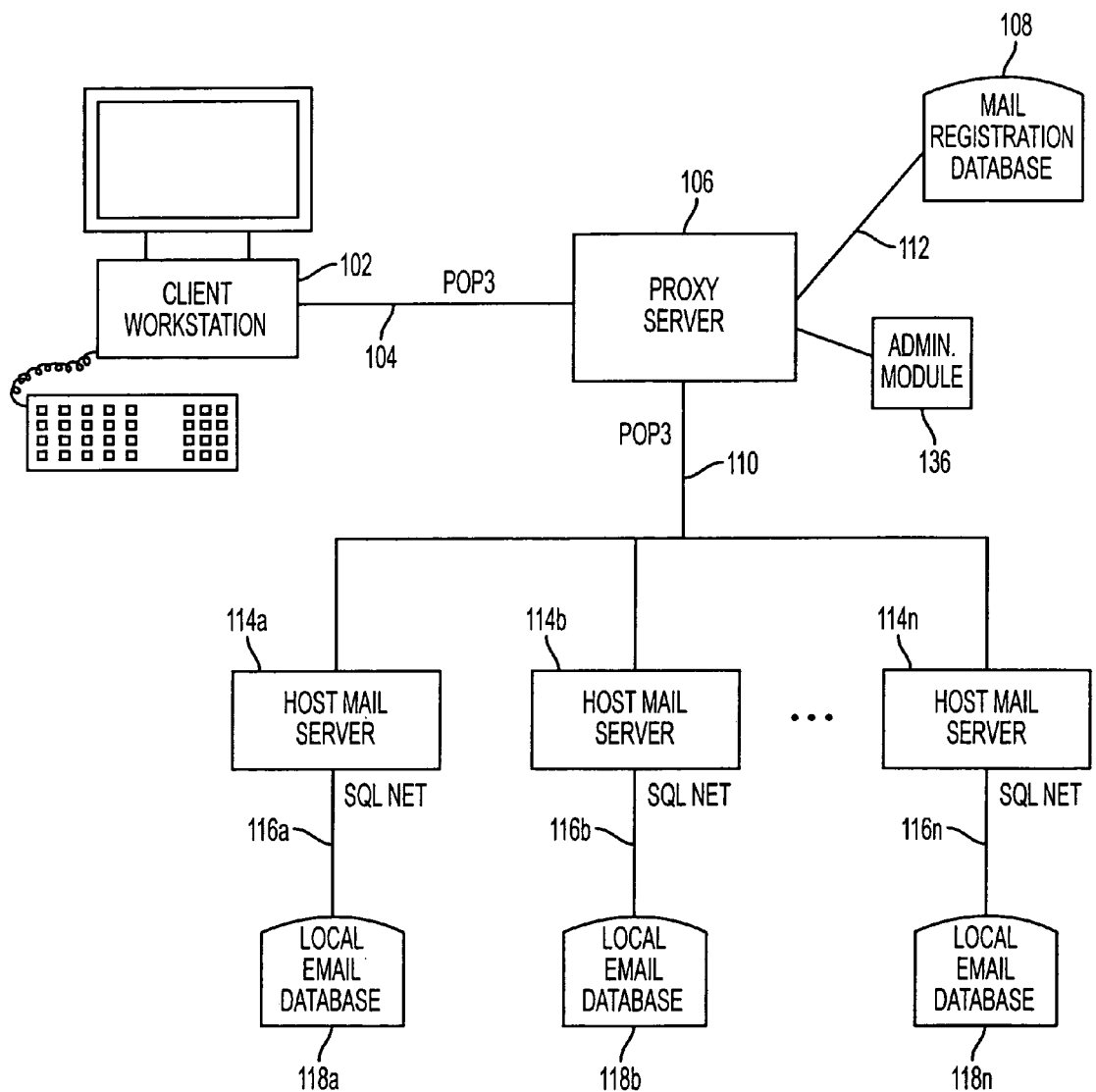
FIG. 2 illustrates a network architecture for integrated message management according to the invention.

The invention will be described with respect to an overall messaging architecture illustrated in FIG. 2. As illustrated in FIG. 2, in the network environment of the invention a client workstation 102 communicates via communications link 104 with a proxy server 106. Client workstation 102 may be, for instance, a personal computer running the Windows™ 95, 98 or NT™, Unix, Linux or other operating systems, and communications link 104 may be a dial-up connection, ISDN, DSL, Ethernet, cable modem, T1 or T3, or other wired or wireless digital or analog communications connection. Proxy server 106 may be, for instance, a workstation running the Windows™, NT™, Unix, Linux or other operating systems.

In the illustrative embodiment, the configured protocol between client workstation 102 and proxy server 106 is the Point to Point (PPP) standard, familiar to persons skilled in the art. Proxy server 106 is connected over connection 112 to a mail registration database 108, in which user ID, account number, ISP, Internet addressing and other information is stored. Connection 112 may be configured according to the LDAP or other protocols.

Proxy server 106 is connected via communications link 110 to a plurality of distributed email servers, 114a, 114b . . . 114n (n arbitrary), which host individual email or other messaging accounts. Communications link 110 may be, for instance, a T1 or T3, frame relay, DSL, cable modem, fiber optic, or other wired or wireless, analog or digital, backbone or other connection, including linkage to or through the Internet. Each of the email servers 114a, 114b . . . 114n is attached to a respective local email database 118a, 118b . . . 118n which hosts incoming and outgoing email messages according to the SMTP, MIME or other network protocols.

Each mail server 114a, 114b . . . 114n is connected to its respective email database via corresponding connection 116a, 116b . . . 116n, each of which may be configured according to the Standard Query Language (SQL) Net protocol or others. In general, the proxy server 106 communicates with remote email servers 114a, 114b . . . 114n using the POP3 scheme, and also communicates with the client workstation 102 using POP3 to identify, retrieve and transmit electronic mail messages.

Figure 3:
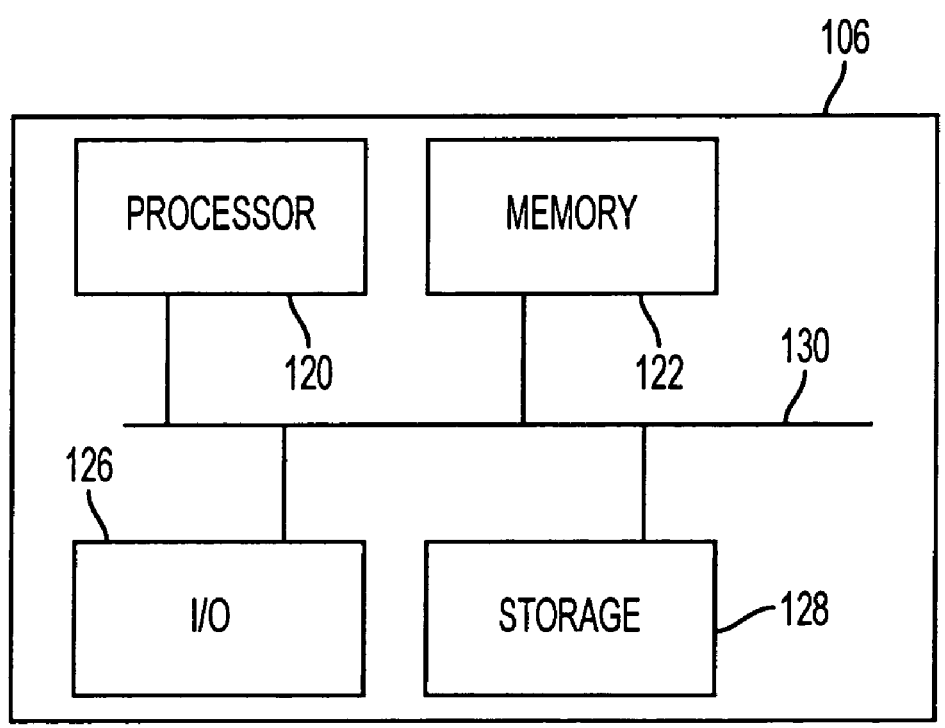
FIG. 3 illustrates aspects of a proxy server used in the invention.

As illustrated in FIG. 3, proxy server 106 may contain a processing unit 120, memory 122 such as electronic RAM, input/output interface 126 and local storage 128 such as a hard drive, connected over an electronic bus 130, as will be appreciated by persons skilled in the art.

Client applications which service an electronic mailbox using the POP3 standard generally proceed through several predefined states during the course of connecting to an email server. Those states include:

TABLE 1

1. Authorization State: The user has not identified themselves to the email server.
2. Transaction State: The user has received authorization to access a mailbox on the email server. The user may issue commands to the email server to list and retrieve messages, and mark selected messages for deletion.
3. Update State: After a user has completed desired retrievals and deletions, the user may issue a quit command, which moves the session to the update state. During this state, the email server deletes any messages that were marked for deletion and terminates the connection to the client.

Figure 6:
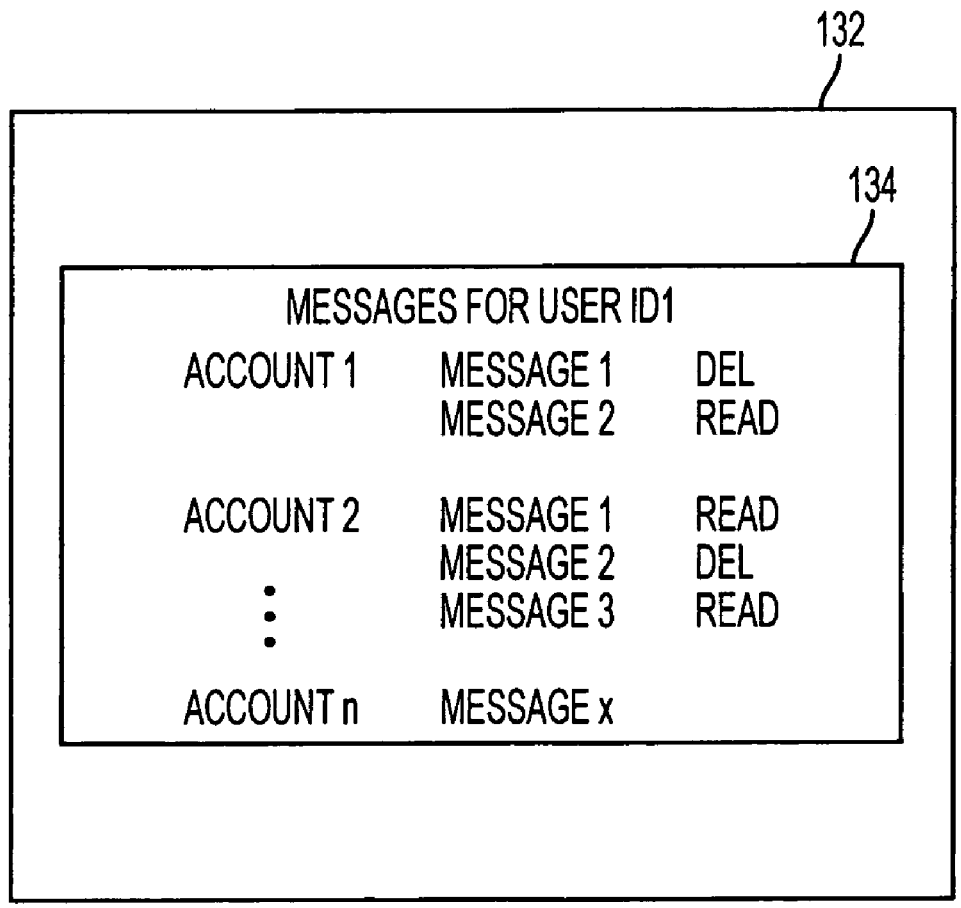
FIG. 6 illustrates an email management process presented to a user according to the invention.

With conventional access packages, for each mailbox that a user wishes to enter, they must go through each of these successive states in serial fashion. While doing so, the user must keep track of the identity and address of each of the POP3 email servers to which they need to connect. In the invention, in contrast, and as illustrated in FIG. 6, a user at client workstation 102 connects to and is serviced by proxy server 106 by presentation of interface module 132 on the client workstation 102. The interface module 132 presents an integrated view into all of the users' available email accounts, regardless of service provider or location. The user may, in general, view a list of all pending email messages, and mark individual messages for download or deletion from interface module 132, without needing to separately access or address each of mail servers 114a, 114b . . . 114n. Interface module 132 is in one regard illustrated in FIG. 6.

Figure 4:
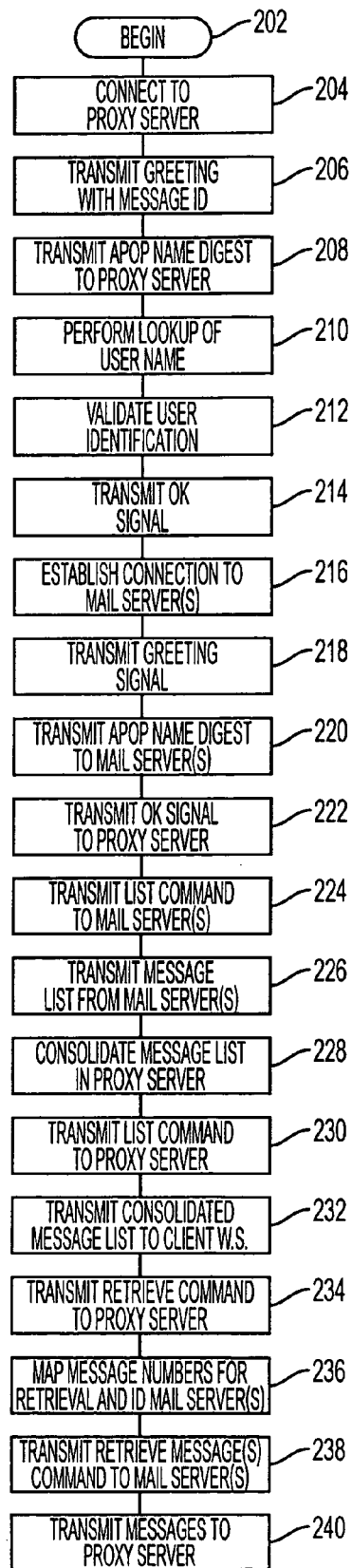
FIGS. 4 and 5 illustrate a flow chart of message processing according to the invention.
Figure 5:
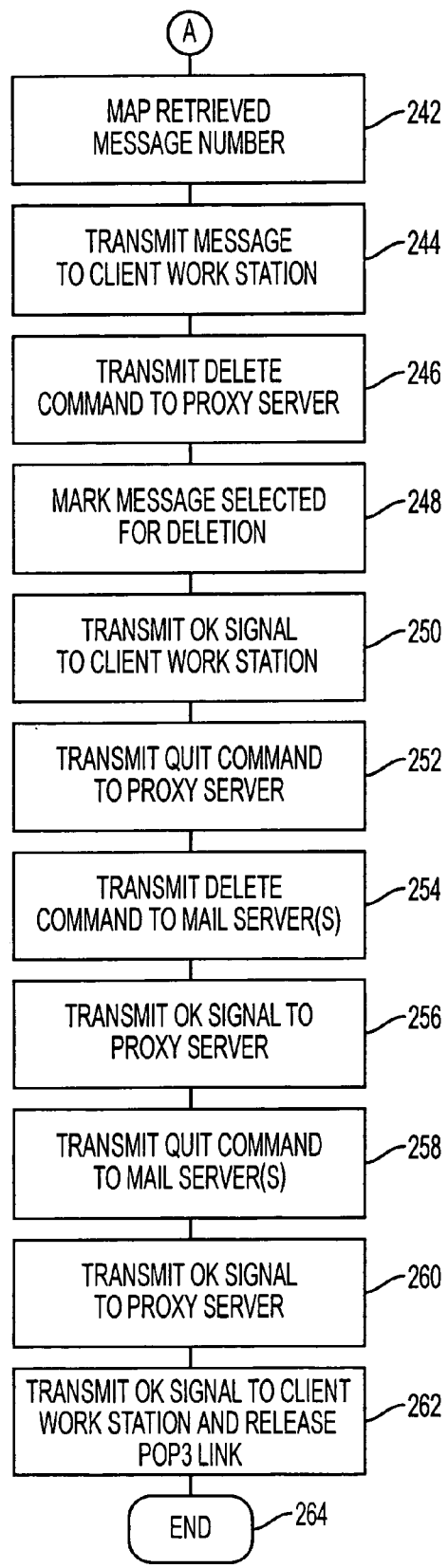

An illustrative sequence of message processing is shown in FIGS. 4 and 5. In step 202, processing begins. In step 204, client workstation 102 connects to proxy server 106. In step 206, proxy server 106 transmits a greeting with a message ID to the client workstation 102. In step 208, client workstation 102 transmits to proxy server 106 an APOP name digest to the proxy server 106, indicating an authorized identity of the user at client workstation 102. In step 210, proxy server 106 performs a look-up of the user's name digest against mail registration database 108.

In step 212, proxy server 106 validates the user's identity, and in step 214 transmits a message to client workstation 102 indicating acceptance of the user's access request over communications link 104. In step 216, proxy server 106 initiates transactions with one or more of mail servers 114a, 114b . . . 114n by establishing a connection to those servers via communications link 110. In step 218, the email servers 114a, 114b . . . 114n respond with a handshake greeting to proxy server 106. In step 220 proxy server 106 transmits to each mail server 114a, 114b . . . 114n user account name information particular to the user's individual account with each service provider, by looking up ID, password and associated information in mail registration database 108. In step 222, email servers 114a, 114b . . . 114n respond with an authorization okay indication to proxy server 106.

After the authorization transactions between proxy server 106 and the distributed email servers 114a, 114b . . . 114n, the proxy server 106 transmits to each of the email servers 114a, 114b . . . 114n a list command to initiate the generation and transmission of a list of pending email messages from each of the individual servers. In step 226, the email servers 114a, 114b . . . 114n respond and transmit to proxy server 106 a message list of pending email messages using the POP3 protocol.

In step 228, the proxy server 106 consolidates the message list received from each of the email servers 114a, 114b . . . 114n for presentation to the user in consolidated message list 134. In step 230, the user at client workstation 102 transmits a list request to proxy server 106. In step 232, proxy server 106 transmits to the user a list of all pending email messages retrieved from all of the user's accounts, which is presented via interface module 132. In step 234, the user manipulates the interface module 132 using an input device such as a mouse or keyboard to indicate which messages within the consolidated message list 134 are desired to be retrieved.

In step 236, the proxy server 106 receives the retrieve command from the required workstation 102 and maps the selected message numbers to associated email accounts with corresponding email servers among email servers 114a, 114b . . . 114n. In step 238, proxy server 106 transmits to the selected email servers a retrieve command to retrieve the user's selected email messages from the local message storage database 118a, 118b . . . 118n for those servers. In step 240, the selected email servers transmit the indicated messages to the proxy server 106. In step 242, the proxy server 106 maps the return message to the listed consolidated message list number on interface module 132. In step 244, proxy server 106 transmits the selected messages to client workstation 102 using the POP3 protocol.

In step 246, the user at client workstation 102 transmits a delete command to delete selected messages of those presented within the consolidated message list 134, and in step 248 proxy server 106 marks the messages selected for deletion by the user in the consolidated message list 134. In step 250, the proxy server 106 transmits to client workstation 102 an OK signal indicating that deletion has been prepared, after which in step 252 client workstation 102 transmits to proxy server 106 a quit command indicating the user's desire to terminate the message retrieval session.

Upon receipt of the quit command, the proxy server 106 transmits in step 254 a delete command to individual email servers 114*a*, 114*b* . . . 114*n* hosting the email messages selected for deletion. In step 256, the email servers 114*a*, 114*b* . . . 114*n* receiving the delete command delete the corresponding email messages, and transmit back to proxy server 106 a delete completion signal indicating that the pending messages have been deleted. In step 258, proxy server 106 transmits a quit command to each of the email servers 114*a*, 114*b* . . . 114*n*. After receipt in step 260 each of the email servers 114*a*, 114*b* . . . 114*n* respond with a quit acknowledge flag to the proxy server 106 and terminate the POP3 connection over communications link 110. In step 262, proxy server 106 transmits a session termination message to client workstation 102, causing interface module 132 to indicate the exiting from the message access session. In step 264, processing ends.

Figure 7:
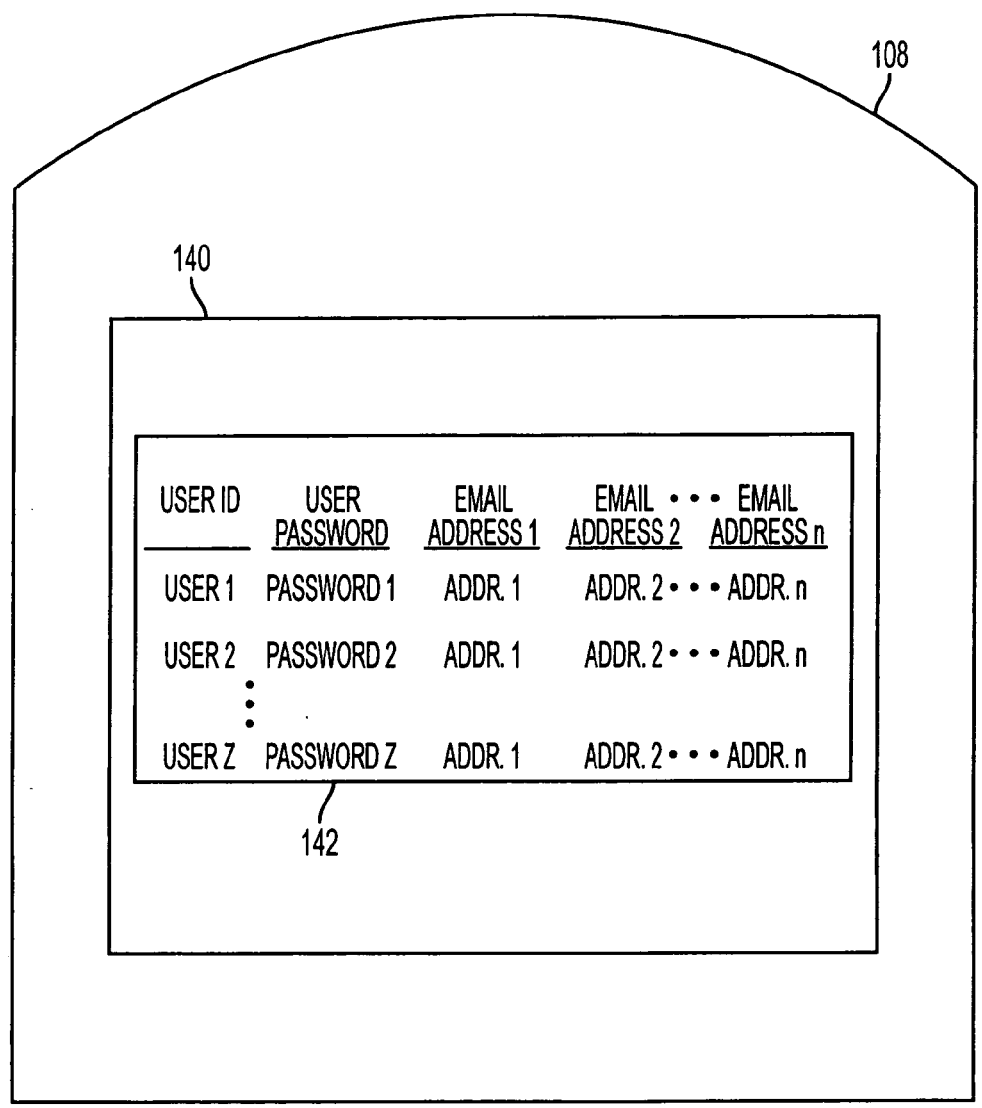
FIG. 7 illustrates a directory structure of a mail registration database according to the invention.

Thus, after the proxy server 106 validates a user using their user ID and password against the mail registration database 108, the proxy server 106 obtains the locations and IP addresses of the user's email mailboxes. The mail registration database 108 is illustrated in more detail in FIG. 7. As shown in that figure, the mail registration database contains global registration object 140 containing one or more profile association records 142, which relate a user ID to password, mailbox address and related fields. The proxy server 106 establishes connections to each such mailbox, retrieves a list of pending email messages and presents a consolidated message list 134 to the user on client workstation 102 via interface module 132.

The proxy server 106 then processes any further commands from the client workstation 102, including NOOP, LIST, STAT, DELE, and RSET commands without necessarily interacting with the backend email servers. It is only necessary for the proxy server 106 to interact with the email servers 114*a*, 114*b* . . . 114*n* when the client workstation issues a command to retrieve a message or to quit the messaging session.

Because the proxy server 106 imitates a POP3 mail server from the point of view of the client workstation 102, proxy server 106 can parse the commands and semantics of all the interactions which occur with the client workstation 102 and present an integrated message port. Proxy server 106 may use this ability to intercept commands issued by client workstation 102 to provide further value added services using administrative module 136, associated with and running on proxy server 106.

Administrative module 136 may perform such activities as recording billing information, archives, links, cookie and other information, and logging connection statistics and other information, all on behalf of a single user entering the messaging system of the invention via proxy-server 106. Thus, in the practice of the invention an extensible set of service processes may be incorporated in administrative module 136 to make the maintenance, billing and other operational aspects of the overall communication system easier to upgrade, maintain and more reliable for service providers.

The foregoing description of the invention is illustrative, and variations in configuration and implementation will occur to persons skilled in the art. For instance, while the invention has been described with respect to the retrieval of text or email messages, other kinds of message information, such as digitized voice, facsimile, alpha-numeric pages and other information may be accessed and retrieved by the invention.

Similarly, while the invention has been described with respect to a single proxy server 106 which collects and distributes email information, the invention may be carried out using an architecture having more than one proxy server giving multiple access points and connection accounts to the user. Or, the functionality described as being executed on a dedicated proxy server 106 may be distributed to one or other hardware resources, including client workstation 102, routers, gateways and other devices. The scope of the invention is accordingly intended only to be limited by the following claims.

What is claimed is:

1. A method of managing a plurality of messages stored in a plurality of individual messaging accounts associated with a single user, the method comprising:

providing an account database associated with a server, wherein the account database stores at least one of passwords or user IDs corresponding to the plurality of individual messaging accounts;

receiving an access request to access selected ones of the plurality of individual messaging accounts associated with the single user, wherein the selected ones of the plurality of individual messaging accounts are determined based on information associated with the single user;

authorizing access to the server based on authorization information associated with the single user;

accessing the account database to retrieve at least one of the passwords or the user IDs corresponding to the selected ones of the plurality of individual messaging accounts;

accessing the selected ones of the plurality of individual messaging accounts by providing the corresponding passwords and/or user IDs to the selected ones of the plurality of individual messaging accounts; and retrieving a report of messages that are pending from the selected ones of the plurality of individual messaging accounts, wherein the messages that are pending include one or more messages that are new and one or more messages that have been reported in a previous report.

2. The method of claim 1 further comprising:

creating a consolidated message list, including at least the messages in the report;

transmitting the consolidated message list as an output; and presenting the consolidated message list on a user interface.

3. The method of claim 2 further comprising:

accepting a message process request to perform predetermined functions on the messages presented in the consolidated message list;

associating the message process request to the corresponding message presented in the consolidated message list; and transmitting the message process request to the selected ones of the plurality of individual messaging accounts.

4. The method of claim 3 wherein the server comprises a networked proxy server.

5. The method of claim 3 wherein selected ones of the plurality of individual messaging accounts have reassignable network addresses.

6. The method of claim 3 wherein the POP3 standard is utilized in at least one step.

7. The method of claim 3 wherein the consolidated message list comprises a list of e-mail messages and the selected ones of the plurality of individual messaging accounts comprise different email accounts.

8. The method of claim 7 further comprising performing predetermined service functions at the message access port.

9. The method of claim 2, wherein the user interface comprises a first portion that lists messages pending in the selected ones of the plurality of individual messaging accounts, and a second portion that lists one or more account indicators that indicate which of the selected ones of the plurality of individual messaging accounts contains the corresponding messages from the first portion.

10. The method of claim 1, wherein the matching password and/or user ID is different for each of the selected ones of the plurality of individual messaging accounts.

11. The method of claim 1, wherein the selected ones of the plurality of individual messaging accounts are accessed individually by providing a corresponding password and/or user ID to each of the selected ones of the plurality of individual messaging accounts.

12. The method of claim 1, wherein the corresponding passwords and/or user IDs are predefined for the selected ones of the individual messaging accounts.

13. A system for managing a plurality of messages stored in a plurality of individual messaging accounts associated with a single user, the system comprising:
   an account database associated with a server, wherein the account database stores at least one of passwords or user IDs corresponding to the plurality of individual messaging accounts;
   a message port on the server adapted to accept an access request, wherein the access request includes authorization information and the access request enables access to the server, wherein the server determines selected ones of the plurality of individual messaging accounts associated with the single user based on information associated with the single user,
   the server further being adapted to:
      authorize access to the server,
      reference the account database,
      match the at least one of the passwords or the user IDs with the corresponding selected ones of the plurality of individual messaging accounts determined in the access request, and
      access the selected ones of the plurality of individual messaging accounts associated with the single user by providing the corresponding passwords and/or user IDs to the selected ones of the plurality of individual messaging accounts; and
   a processor unit in communication with the message port, wherein the processor unit accesses the selected ones of the plurality of individual messaging accounts and retrieves a report of messages that are pending on the selected ones of the plurality of individual messaging accounts, and wherein the messages that are Pending include one or more messages that are new and one or more messages that have been reported in a previous report.

14. The system of claim 13 wherein the messages comprise electronic mail and selected ones of the plurality of individual messaging accounts comprise different electronic mail accounts.

15. The system of claim 13 wherein the server comprises a networked proxy server.

16. The system of claim 13 wherein the processor unit retrieves information from selected ones of the plurality of individual messaging accounts and creates a consolidated message list that includes at least the messages included in the report.

17. The system of claim 16 wherein the processor unit accepts message process requests that perform predetermined functions on the messages presented in the pending message list.

18. The system of claim 17 wherein the message process requests comprise at least one of selecting messages, deleting messages or reading messages.

19. The system of claim 13 wherein the POP3 standard is utilized in at least one communication.

20. The system of claim 13, further comprising an administrative module in communication with the message access port, wherein the administrative module is adapted to perform predetermined service functions.

21. The system of claim 13, wherein the server is further adapted to individually access each of the selected ones of the plurality of individual messaging accounts by providing each of the selected ones of the plurality of individual messaging accounts with a corresponding password and/or user ID.

22. The system of claim 13, wherein the matching password and/or user ID is different for each of the selected ones of the plurality of individual messaging accounts.

23. The system of claim 13, wherein the corresponding passwords and/or user IDs are predefined for the selected ones of the individual messaging accounts.

24. A system for managing a plurality of messages stored in a plurality of individual messaging accounts associated with a single user, the system comprising:
   account database means for storing at least one of passwords or user IDs corresponding to the plurality of individual messaging accounts, the account database means associated with a server;
   message port means for receiving an access request as an input to enable access to selected ones of the plurality of individual messaging accounts associated with the single user, wherein the selected ones of the plurality of individual messaging accounts are determined based on information associated with the single user;
   server authorization means for authorizing access to the server based on authorization information associated with the single user;
   referencing means for referencing the account database, wherein the account database stores corresponding ones of the at least one of the passwords or the user IDs corresponding to the selected ones of the plurality of individual messaging accounts determined in the access request;
   matching means for matching the at least one of the passwords or the user IDs with the corresponding selected ones of the plurality of individual messaging accounts determined in the access request;
   authorizing means for authorizing access to the selected ones of the plurality of individual messaging accounts by providing the selected ones of the plurality of individual messaging accounts with the matched passwords and/or user IDs; and
   processing means for communicating with the message port means, wherein the processing means accesses the selected ones of the plurality of individual messaging accounts and retrieves a report of messages that are pending on the selected ones of the plurality of individual messaging accounts, and wherein the messages that are pending include one or more messages that are new and one or more messages that have been reported in a previous report.

25. The system of claim 24 wherein the messages comprise electronic email and selected ones of the plurality of individual messaging accounts comprise different electronic mail accounts.

26. The system of claim 24 wherein the server comprises a networked proxy server.

27. The system of claim 24 wherein the processing means retrieves information from selected ones of the plurality of individual messaging accounts and creates a consolidated message list that includes at least the messages included in the report.

28. The system of claim 27 wherein the processing means accepts message process requests that perform predetermined functions on the messages presented in the pending message list.

29. The system of claim 28 wherein the message process requests comprise at least one of selecting messages, deleting messages or reading messages.

30. The system of claim 24, wherein the authorizing means individually accesses each of the selected ones of the plurality of individual messaging accounts by providing each of the selected ones of the plurality of individual messaging accounts with a corresponding password and/or user ID.

31. The system of claim 24, wherein the matching password and/or user ID is different for each of the selected ones of the plurality of individual messaging accounts.

32. The system of claim 24, wherein the matched passwords and/or user IDs are predefined for the selected ones of the individual messaging accounts.

33. A storage medium for storing computer readable code, the computer readable code being executable to manage a plurality of messages stored in a plurality of individual messaging accounts associated with a single user, the medium comprising:
computer readable code for providing an account database associated with a server, wherein the account database stores at least one of passwords or user IDs corresponding to the plurality of individual messaging accounts;
computer readable code for receiving an input of an access request to access selected ones of the plurality of individual messaging accounts associated with the single user, wherein the selected ones of the plurality of individual messaging accounts are determined based on information associated with the single user;
computer readable code for authorizing access to the server based on authorization information associated with the single user;
computer readable code for accessing the account database to retrieve the at least one of the passwords or the user IDs corresponding to the selected ones of the plurality of individual messaging accounts;
computer readable code for accessing the selected ones of the plurality of individual messaging accounts by providing the selected ones of the plurality of individual messaging accounts with the corresponding passwords and/or user IDs; and
computer readable code for retrieving a report of messages that are pending from the selected ones of the plurality of individual messaging accounts, wherein the messages that are pending include one or more messages that are new and one or more messages that have been reported in a previous report.

34. The medium of claim 33 further comprising:
computer readable code for creating a consolidated message list, including at least the messages included in the report; and
computer readable code for transmitting the consolidated message list as an output.

35. The medium of claim 33 further comprising:
computer readable code for accepting a message process request;
computer readable code for associating the message process request to the corresponding message presented in the consolidated message list; and
computer readable code for transmitting the message process request to the selected ones of the plurality of individual messaging accounts.

36. The system of claim 33, wherein the authorizing means individually accesses each of the selected ones of the plurality of individual messaging accounts by providing each of the selected ones of the plurality of individual messaging accounts with a corresponding password and/or user ID.

37. The system of claim 33, wherein the matching password and/or user ID is different for each of the selected ones of the plurality of individual messaging accounts.

38. The storage medium of claim 33, wherein the corresponding passwords and/or user IDs are predefined for the selected ones of the individual messaging accounts.

39. A system for enabling a single user to manage a plurality of messages stored in two or more individual messaging accounts associated with the single user, the individual messaging accounts being associated with different service providers, the system comprising:
two or more individual messaging accounts associated with the single user, the individual messaging accounts being associated with different service providers;
an interface module for determining the single user, authorizing the single user and matching the single user to the corresponding two or more individual messaging accounts associated with the single user;
a storage module, wherein the storage module stores at least one of user IDs or passwords corresponding to the two or more individual messaging accounts associated with the single user;
an authorization module for accessing each of the two or more individual messaging accounts associated with the single user, wherein the authorization module references the storage module and matches the at least one of the user IDs or passwords with corresponding ones of the two or more individual messaging accounts associated with the single user, and wherein the authorization module provides each of the two or more individual messaging accounts with the matching password and/or user IDs; and
a report retrieving module that retrieves a report of messages that are pending on the selected ones of the plurality of individual messaging accounts, wherein the messages that are pending include one or more messages that are new and one or more messages that have been reported in a previous report.

40. The system of claim 39, wherein the matching password and/or user ID is different for each of the two or more individual messaging accounts.

41. The system of claim 39, wherein the matching passwords and/or user IDs are predefined for the selected ones of the individual messaging accounts.

42. A method of managing a plurality of messages stored in a plurality of individual messaging accounts associated with a single user using a proxy server, the method comprising:
- receiving an authorization request, the authorization request including user identification information;
- performing a proxy server authorization to enable access to the proxy server based on the user identification information;
- determining two or more individual messaging accounts associated with the single user identification information;
- retrieving at least one of account passwords or account user IDs associated with the two or more individual messaging accounts associated with the single user;
- performing an individual messaging account authorization for the two or more individual messaging accounts by providing the two or more individual messaging accounts with corresponding ones of the at least one of the account passwords or the account user IDs; and
- retrieving a report of messages that are pending on the selected ones of the plurality of individual messaging accounts, wherein the messages that are pending include one or more messages that are new and one or more messages that have been reported in a previous report.

43. A method of managing a plurality of messages stored in a plurality of individual messaging accounts associated with the single user using a proxy server, the method comprising:
- providing a account database for storing at least one of passwords or user IDs corresponding to the plurality of individual messaging accounts associated with the single user;
- accepting a user access request for at least a first individual messaging account associated with the single user and a second individual messaging account associated with the single user, wherein the user access request includes user identification information;
- performing a first authorization based on the user identification information;
- accessing the account database to obtain at least one of a password or a user ID for at least the first individual messaging account associated with the single user and the second individual messaging account associated with the single user;
- performing an individual messaging account authorization that includes:
  - providing at least one of a first user ID or a first password to the first individual messaging account associated with the single user and providing at least one of a second user ID or a second password to the second individual messaging account associated with the single user, and
  - retrieving a report of messages that are pending on the selected ones of the plurality of individual messaging accounts associated with the single user, wherein the messages that are sending include one or more messages that are new and one or more messages that have been reported in a previous report.

44. A method of managing a plurality of messages stored in a plurality of individual messaging accounts associated with a single user, the method comprising:
- authorizing access to a server based on user identification information;
- accepting a user access request to access selected ones of the plurality of individual messaging accounts associated with the single user, wherein the plurality of individual messaging accounts associated with the single user are determined based on the user identification information;
- individually gaining authorization to access the selected ones of the plurality of individual messaging accounts associated with the single user, wherein the server provides the selected ones of the plurality of individual messaging accounts associated with the single user with account specific authorization information; and
- retrieving a report of messages that are pending on the selected ones of the plurality of individual messaging accounts associated with the single user, wherein the messages that are pending include one or more messages that are new and one or more messages that have been reported in a previous report.

45. The method of claim 44 further comprising:
- presenting a consolidated message list on a user interface, the consolidated message list including messages contained in the report, wherein the user interface comprises a first portion that lists the messages contained in the report and a second portion that lists one or more account indicators that indicate which of the selected ones of the plurality of individual messaging accounts contains that corresponding messages from the first portion of the user interface.

46. A method of managing a plurality of messages stored in a plurality of email messaging accounts associated with a single user using a proxy server, the method comprising:
- providing an account database for storing at least one of account-specific passwords or account-specific user IDs corresponding to the plurality of email messaging accounts associated with the single user;
- receiving a user access request to access selected ones of the plurality of email messaging accounts associated with the single user, wherein the selected ones of the plurality of email messaging accounts associated with the single user are determined based on user identification information;
- authorizing access to the proxy server based on the user identification information;
- accessing an account database to obtain corresponding ones of the at least one of the account-specific passwords or the account-specific user IDs for the selected ones of the plurality of email messaging accounts associated with the single user;
- matching the corresponding ones of the at least one of the account-specific passwords or the account-specific user IDs with the corresponding selected ones of the plurality of email messaging accounts associated with the single user;
- individually gaining authorization to the selected ones of the plurality of email messaging accounts associated with the single user by providing the corresponding ones of the at least one of the account-specific passwords or the account-specific user IDs to the selected ones of the plurality of email messaging accounts associated with the single user; and
- retrieving a report of messages that are pending on the selected ones of the plurality of individual messaging accounts associated with the single user, wherein the messages that are pending include one or more messages that are new and one or more messages that have been reported in a previous report.

47. A system for managing a plurality of messages stored in a plurality of individual messaging accounts associated with a single user using a proxy server, the system comprising:

authorization request receiving means for receiving an authorization request at a message access port on the proxy server, the authorization request including user identification information associated with the single user;

proxy server authorization means for performing authorization to enable access to the proxy server based on the user identification information;

account determining means for determining two or more individual messaging accounts associated with the user identification information that is associated with the single user;

retrieving means for retrieving at least one of account passwords or account user IDs for the two or more individual messaging accounts associated with the single user;

individual messaging account authorization means for performing authorization for the two or more individual messaging accounts associated with the single user by providing the two or more individual messaging accounts associated with the single user with corresponding ones of the at least one of the account passwords or the account user IDs; and report retrieving means for retrieving a report of messages that are pending on the selected ones of the plurality of individual messaging accounts associated with the single user, wherein the messages that are pending include one or more messages that are new and one or more messages that have been reported in a previous report.

48. A system for managing a plurality of messages stored in a plurality of individual messaging accounts associated with the single user using a proxy server, the system comprising:

an account database means for storing at least one of passwords or user IDs corresponding to the plurality of individual messaging accounts associated with the single user;

a message access means that accepts a user access request for at least a first individual messaging account associated with the single user associated with the single user and a second individual messaging account, wherein the message access means receives the user access request at a message access port on the proxy server, and wherein the user access request includes user identification information;

a proxy server authorization means that performs an authorization based on the user identification information;

an accessing means that accesses the account database to obtain at least one of a password or a user ID for at least the first individual messaging account associated with the single user and the second individual messaging account associated with the single user;

an individual messaging account authorization means for performing authorization, the individual messaging account authorization means including:

providing means for providing at least one of a first user ID or a first password to the first individual messaging account associated with the single user and providing at least one of a second user ID or a second password to the second individual messaging account associated with the single user, and report retrieving means for retrieving a report of messages that are pending on the selected ones of the plurality of individual messaging accounts associated with the single user, wherein the messages that are pending include one or more messages that are new and one or more messages that have been reported in a previous report.

49. A system for managing a plurality of messages stored in a plurality of individual messaging accounts associated with a single user, the system comprising:

a server authorization module that authorizes access to a server based on user identification information;

a message access port that accepts, at the server, a user access request to access selected ones of the plurality of individual messaging accounts associated with the single user, wherein the plurality of individual messaging accounts associated with the single user are determined based on the user identification information;

an individual account accessing module that individually gains authorization to access the selected ones of the plurality of individual messaging accounts associated with the single user, wherein the server provides the selected ones of the plurality of individual messaging accounts associated with the single user with account specific authorization information; and a report retrieving module that retrieves a report of messages that are pending on the selected ones of the plurality of individual messaging accounts associated with the single user, wherein the messages that are pending include one or more messages that are new and one or more messages that have been reported in a previous report.

50. The system of claim 49 further comprising:

a consolidated message module that presents a consolidated message list on a user interface, the consolidated message list including messages contained in the report, wherein the user interface comprises:

a first portion that lists the messages contained in the selected ones of the plurality of individual messaging accounts associated with the single user, and a second portion that lists one or more account indicators that indicate which of the selected ones of the plurality of individual messaging accounts associated with the single user contains the corresponding messages from the first portion of the user interface.

51. A method of accessing a plurality of individual messaging accounts associated with a single user individually using a single access request to a proxy server, the method comprising:

receiving an access request for accessing selected ones of a plurality of individual messaging accounts associated with the single user and authorizing access to the proxy server; o automatically retrieving pre-stored account authorization information for the selected ones of the plurality of individual messaging accounts associated with the single user;

individually authorizing the selected ones of the plurality of individual messaging accounts associated with the single user by providing the selected ones of the plurality of individual messaging accounts associated with the single user with the corresponding pre-stored authorization information; and retrieving a report of messages that are pending on the selected ones of the plurality of individual messaging accounts associated with the single user, wherein the messages that are pending include one or more messages that are new and one or more messages that have been reported in a previous report.

* * * * *